Jan. 18, 1944.  C. D. PETERSON ET AL  2,339,512
BALKING RING CLUTCH
Original Filed Nov. 28, 1939
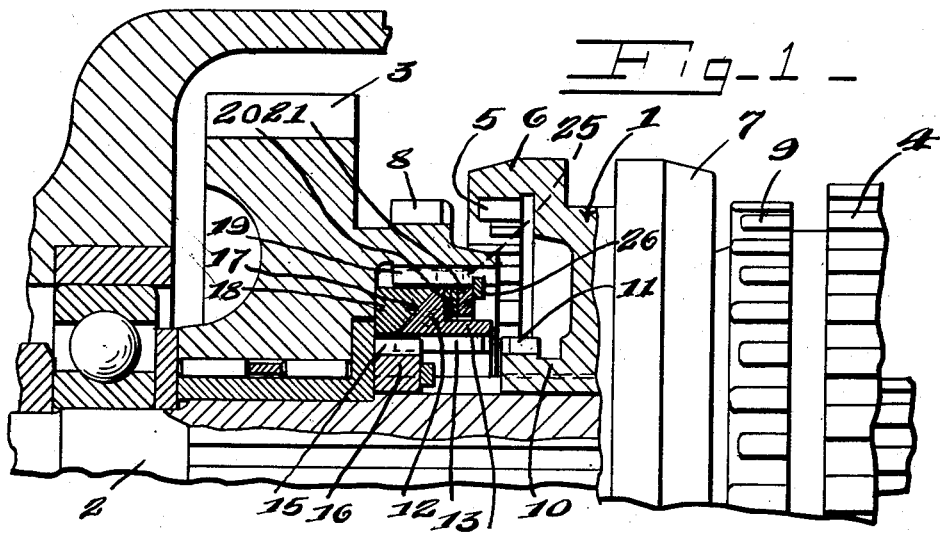
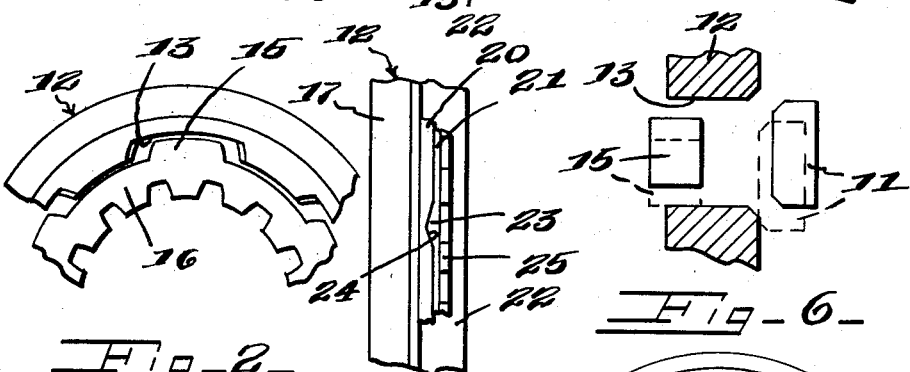
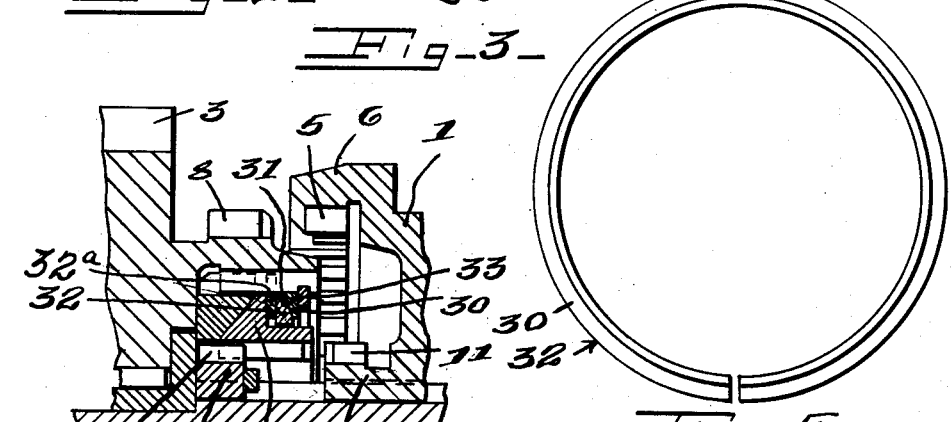
INVENTORS
Carl D. Peterson
Albert H. Daimel
BY Bodell & Thompson
ATTORNEYS.

Patented Jan. 18, 1944

2,339,512

UNITED STATES PATENT OFFICE 2,339,512

BALKING RING CLUTCH

Carl D. Peterson and Albert H. Deimel,
Toledo, Ohio

Original application November 28, 1939, Serial No. 306,526. Divided and this application June 27, 1940, Serial No. 342,766

5 Claims. (Cl. 192—53)

This application is a division of application Serial No. 306,526 filed Nov. 28, 1939, now Patent No. 2,276,862, issued March 17, 1942.

This invention relates to balking ring clutches, particularly for change-speed transmission gearing, and has for its object a balking ring clutch embodying means for frictionally engaging the balking ring with the friction ring or part with which it coacts with a force controlled by the difference in speeds between the two parts to be positively clutched together, and in proportion to the difference in speeds.

More specifically, it has for its object a balking ring clutch in which the balking ring is frictionally engaged with the ring with which it coacts by a wedging action or by cam parts coacting inclined-plane fashion in accordance with the differences in the speeds of the two parts to be positively clutched together.

The invention consists in the novel features and in the combinations and constructions hereinafter set forth and claimed.

In describing this invention, reference is had to the accompanying drawing in which like characters designate corresponding parts in all the views.

Figure 1 is a fragmentary sectional view of one form of this balking ring clutch, the contiguous parts of the transmission gearing to be clutched together being also shown.

Figure 2 is a fragmentary sectional view of the balking ring and contiguous parts.

Figure 3 is a fragmentary edge view of the balking ring shown in Figure 2, the cam parts being also shown.

Figure 4 is a view similar to Figure 1 showing a slightly modified form of the cam parts of the clutch.

Figure 5 is a detail view of one of the cam rings shown in Figure 4.

Figure 6 is a diagrammatic view showing the operation of the balking ring.

1 designates the shiftable section of the balking ring clutch, it being shown as of double construction, and shiftable axially in opposite directions from neutral position to clutch to a shaft, as 2, one or the other of the two gears 3, 4 of different gear trains for transmitting motion to another shaft not shown. The section 1 is formed with clutch teeth, as internal clutch teeth 5 formed within annular portions 6, 7 on opposite ends of the section 1, the shiftable section being shiftable in one direction, as to the left, to interlock the teeth 5 with complemental teeth 8 on the gear 3, and in the other direction from neutral to interlock similar teeth 5 in the annular portion 7 with teeth 9 on the gear 4. The alternate teeth of the two sets of teeth 8, 9 are shown as formed shorter than the remainder teeth to facilitate the interlocking of the teeth 5 therewith. The section 1 is slidably splined to the shaft 2 to rotate therewith. The section is also formed, here shown as on the hub 10 thereof, with blocking projections 11 for coacting with the balking ring.

12 designates the balking ring, this being rotatable with the section 1 and also relatively thereto, within limits, it being here shown as formed with internal passages 13 extending axially thereof for receiving projections 15 on a ring 16 splined on the shaft 2, and hence rotatable as a unit with the section 1. The projections 15 are of less width than the passages 13 for permitting rocking movement of the balking ring 12 relatively to the section 1 and the blocking projections 11 thereon. The blocking projections 11 are of such width as to slidably fit passages 13 when alined therewith, and to lap the balking ring on one side or the other of the passage 13, as seen in Figure 6, when the speeds of the two parts to be clutched together are different. The passages 13 and blocking projections 11 are brought into alinement as the speeds of the two parts to be clutched together cross. The balking ring 12 is provided with a friction face 17 here shown as of comparatively steep conical angle, as 45°, coacting with a complemental face on the gear 3 or gear 4 or on a ring 18 rotatable with the gear 3 or 4. As shown, the gear 3 or the hub thereof, which is provided with the external teeth 8 is formed with a recess, the cylindrical wall of which is formed with internal teeth or splines 19. The ring 18 has teeth interlocked with the teeth 19. The balking ring 12 is also located in the recess.

The cam means include two parts having surfaces coacting inclined-plane fashion, when the two parts to be clutched together are rotating at different speeds to thrust the balking ring axially with the axial force commensurate with or in proportion to the difference in the speeds. In the form shown in Figures 1, 2 and 3, these parts include rings 20, 21 surrounding the hub 22 of the balking ring 12, which hub is formed by an annular recess in the ring, one of the rings having a cam projection 23 and the other a complemental notch 24. The projection has oppositely inclined cam faces and the walls of the notch are complementally formed. One of the cam parts frictionally coacts with the balking ring and tends to lightly frictionally clutch the balking ring, and the other 21 rotates with the section 3, it being here shown as formed with peripheral teeth 25 interlocked with the teeth or splines 19. The parts are held assembled and engaged by a lock ring 26. Owing to the cams or inclined planes 23, 24, the friction is increased between the rings 12 and 18, due to a slight axial thrust imparted to the ring 20, preliminary to clutch engagement. This is due to the fact that the driving member and the gear 3 or 4 are rotating at different speeds. This slight axial thrust is in proportion to the differences in speed and hence additional throw-out or friction engagement at 17 is in accordance with the differences in speed. Initially when the balking ring has taken up all the lost motion between the tooth 15 and the side walls of the recess 13, a slippage occurs between the ring 20 and the balking ring 12. As the speeds cross or approach each other, this axial thrust becomes less. The friction between the balking ring and the ring 18 is for the purpose only, and is sufficient only, to rock the balking ring and not transmit torque. The balking ring has no appreciable braking or synchronizing effect, but on the contrary, the balking ring is dragged to locked position during differential speeds and is dragged back to unlocked position, as the speeds cross, due to acceleration or deceleration of the engine driven shaft in accordance with whether or not the shift is a down shift or an up shift.

In operation, the shaft 2 is the drive shaft or the shaft actuated by the engine, and assuming the gear 3 is to be clutched to the shaft 2 to rotate therewith, shifting of the clutch section 1 to the left brings the balking projections 11 into a position on one side or the other of the passages 13, balking complete shifting in to interlock the clutch teeth 5 with the teeth 8, as the balking ring has been rocked (Figure 6) by the drag of the balking ring 12 on the ring 18, so that the balking ring 12 and the blocking projections 11 with the projections 15 occupy the relative position shown in broken lines, it being understood that the friction face of the balking ring 12 is normally frictionally engaged with the friction face of the ring 18, due to the assembly of the rings 20, 21. When the shift is initiated and the shifting in blocked, the greater difference in the speed the greater axial pressure applied to the balking ring 12, and the greater the pressure between the friction ring 12 and the ring 18, because one ring 20 or 21 tends to rock or turn circumferentially relatively to the other, and cause the inclined-plane surfaces of the projections 23 and the notch 24 to slide one on the other, and thrust the balking ring 12 axially and cause its friction face to engage the ring with a value commensurate with the speed. As the speeds cross, as by deceleration of the shaft 2, when a shift is being made up or acceleration when a shift is being made down into a lower speed, or when the driven element 3 is accelerated under some conditions, as when the road speed of the vehicle becomes greater than the engine speed, as when coasting, the balking ring, due to its frictional drag, assumes a position wherein the projections 11 are alined with the passages 13 of the balking ring, so that the shifting in can be completed. This occurs when the speeds of two parts to be clutched together cross.

In the form shown in Figure 4, the inclined-plane faces or cam faces 30, 31 are provided on rings 32, 33, the ring 32 being interposed between the ring 33 and an additional ring 32ᵃ which is interposed between the ring 32 and the balking ring, and here shown as rotatable with the gear 3, the ring 32 being frictionally engaged with the ring 32ᵃ and hence is free to slip relatively to the ring 32ᵃ and the balking ring is free to slip relatively to the ring 32ᵃ. These rings are held assembled to the balking ring and section 3 by a lock ring similar to the lock ring 26. The ring 32 is split and normally sprung or expanded slightly radially, and hence contracted under tension when assembled in position on the balking ring, and therefore tends to expand and cause the faces 30, 31 to slide radially or wedge inclined-plane fashion one on the other, and transmit an axial thrust on the balking ring, owing to the fact that the faces 30, 31 extend in a general radial direction. Owing to these cam faces and the tension in the ring 32, the balking ring has, in effect, a slight spring pressure behind it.

In the operation of the clutch shown in Figure 4, the normal engagement of the rings 32, 33 thrust the balking ring initially axially with sufficient force to engage its friction face, so as to cause the balking ring 12 to rock into a position analogous to that shown in dotted lines in Figure 6 when the speeds are differential, and this frictional force is increased or commensurate with the speed of the shaft 2, as the greater the speed the greater the centrifugal force, and hence greater the expansion of the ring 32 and greater the end thrust, due to the cam faces 30 and 31.

In either the form shown in Figures 1 and 3 and Figure 4, the coacting cam faces of the projection 23 and notch 24 (Figure 3) or the radial cam faces 30, 31 of the rings 31, 32 (Figure 4) create an axial thrust on the balking ring, which causes the initial drag at 17 of the balking ring 12 on the ring 18.

What we claim is:

1. In a balking ring clutch, the combination with driving and driven toothed sections, one of which is shiftable axially, a balking ring rotatable with one of said sections and also relatively thereto, within limits, and frictionally coacting with the other section, and having means for blocking the axial shifting of the shiftable section, when the sections are rotating at different speeds, means for pressing the balking ring axially into engagement with the other section including coacting cam parts having cam faces arranged to coact inclined plane fashion during rotation of the driving and driven sections and to exert an axial pressure against the balking ring.

2. In a balking ring clutch, the combination with driving and driven toothed sections, one of which is shiftable axially, a balking ring rotatable with one of said sections and also relatively thereto, within limits, and frictionally coacting with the other section, and having means for blocking the axial shifting of the shiftable section, when the speeds of the sections are different, means for pressing the balking ring axially into engagement with the other section including cam parts, means by which said cam parts partake of the rotative movement of the other section and the balking ring respectively, said cam parts coacting inclined-plane fashion and operable at differential speeds to thrust the balking ring axially, one of the cam parts being formed with a cam projection extending parallel to the axis of the balking ring, and the other with a notch for receiving the projection, the projection and the notch having side walls coacting inclined-plane fashion.

3. In a balking ring clutch, the combination with driving and driven toothed sections, one of which is shiftable axially, a balking ring rotatable with the axially shiftable section and also relatively thereto, within limits, and frictionally co-acting with the other section; of means for pressing the balking ring into engagement with the other section including frictionally-coacting, opposing, axially-thrusting cam parts interposed between the balking ring and said other section and operating upon rotation of the driving and driven sections to press the balking ring into frictional engagement with the other section with a force in accordance with the rotative speeds preliminary to engagement of the clutch sections.

4. In a balking ring clutch, the combination with driving and driven toothed sections, one of which is shiftable axially, a balking ring rotatable with the axially shiftable section and also relatively thereto, within limits, and frictionally co-acting with the other section; of means for pressing the balking ring into engagement with the other section including frictionally-coacting, opposing, axially-thrusting cam parts interposed between the balking ring and said other section and operating upon rotation of the driving and driven sections to press the balking ring into frictional engagement with the other section with a force in accordance with the rotative speeds preliminary to engagement of the clutch sections, one of said cam parts being a split ring expansible radially outward to act inclined-plane fashion on the other of said parts.

5. In a balking ring clutch, the combination with driving and driven toothed sections, one of which is shiftable axially, a balking ring rotatable with the axially shiftable section and also relatively thereto, within limits, and frictionally co-acting with the other section; of means for pressing the balking ring into engagement with the other section including frictionally-coacting, opposing, axially-thrusting cam parts interposed between the balking ring and said other section and operating upon rotation of the driving and driven sections to press the balking ring into frictional engagement with the other section with a force in accordance with the rotative speeds preliminary to engagement of the clutch sections, the cam parts having faces extending in a general direction radially relatively to the axes of the clutch sections and coacting inclined-plane fashion, one of the parts having an outward radial action during rotation.

CARL D. PETERSON.
ALBERT H. DEIMEL.